L. H. HALVERSON.
WAGON RACK.
APPLICATION FILED APR. 24, 1920.
1,381,634.
Patented June 14, 1921.
3 SHEETS—SHEET 2.
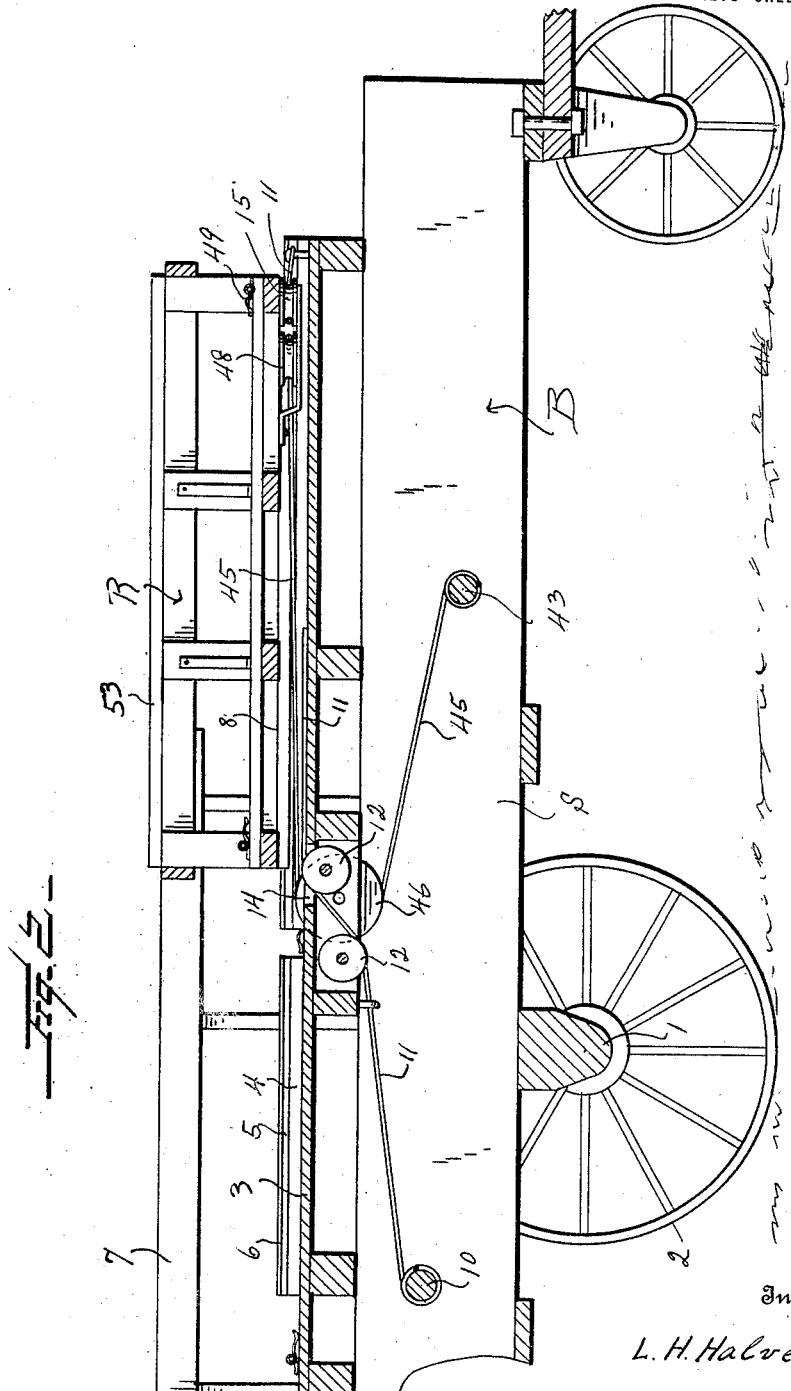

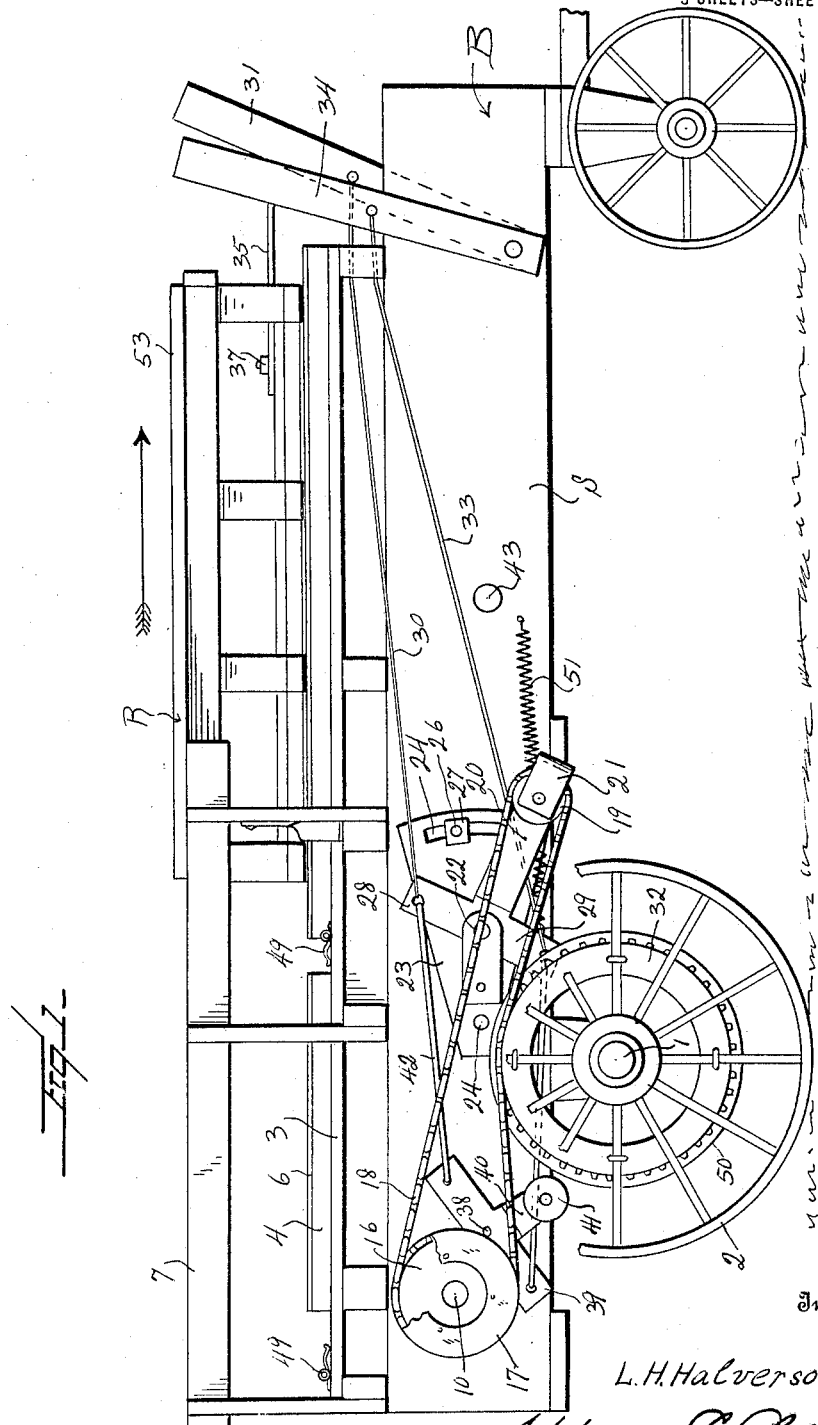

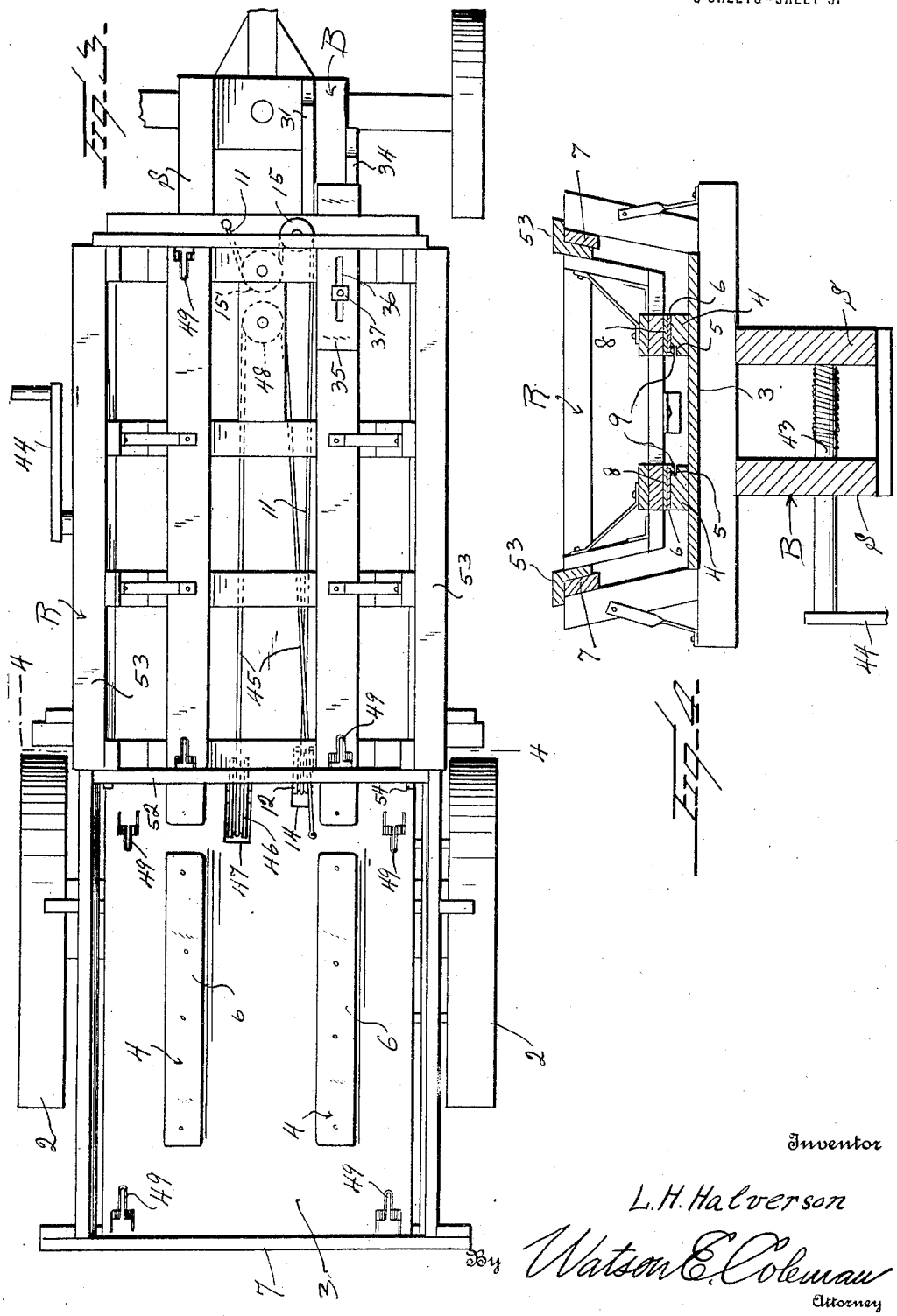

UNITED STATES PATENT OFFICE.

LEWIS H. HALVERSON, OF MILLER, IOWA.

WAGON-RACK.

1,381,634.  Specification of Letters Patent.  Patented June 14, 1921.

Application filed April 24, 1920. Serial No. 376,319.

*To all whom it may concern:*

Be it known that I, LEWIS H. HALVERSON, a citizen of the United States, residing at Miller, in the county of Hancock and State of Iowa, have invented certain new and useful Improvements in Wagon-Racks, of which the following is a specification, reference being had to the accompanying drawings.

This invention relates to certain improvements in wagon racks, and it is an object of the invention to provide a novel and improved device of this general character embodying two relatively movable sections, together with means operated from a wheel or other movable part of the vehicle for imparting movement to one of said sections in one direction.

Another object of the invention is to provide a novel and improved rack of this general character embodying mechanical means for moving a section thereof in one direction and wherein means are rendered inoperative automatically upon movement of said section a predetermined distance.

Furthermore, it is an object of the invention to provide a novel and improved wagon rack embodying two relatively movable sections, together with the mechanism for imparting movement to one of said sections in one direction and which mechanism is adapted to be manually adjusted into or out of driven connection with a wheel or other movable part of the vehicle.

A more particular object of the invention is to provide a novel and improved rack adapted to trail a hay loader, or the like, and wherein the rack is provided with means whereby the same may be substantially completely filled with the loader discharging thereupon at the rear portion of the rack.

The invention also has for an object to provide a novel and improved device of this general character embodying two relatively movable rack sections and wherein means are provided for maintaining in applied position across either or both sections of the rack slings, or kindred elements, to facilitate the removal of the load carried by the rack.

The invention consists in the details of construction and in the combination and arrangement of the several parts of my improved wagon rack whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation of a wagon rack constructed in accordance with an embodiment of my invention;

Fig. 2 is a longitudinal vertical sectional view taken through the device as illustrated in Fig. 1;

Fig. 3 is a view in top plan of my improved rack as herein disclosed; and

Fig. 4 is a sectional view taken substantially on the line 4—4 of Fig. 3.

As disclosed in the accompanying drawings, B denotes a wheel supported body including the rear axle 1 having mounted upon each end portion thereof a supporting wheel 2.

The body B includes a floor or platform 3 having arranged on its upper surface the longitudinally disposed cleats 4. The cleats 4 are preferably arranged in pairs with the cleats of each pair in longitudinal alinement and a slight space between the adjacent ends thereof. The inner upper longitudinal marginal portion of each of the cleats 4 is provided with a rabbet 5 co-extensive in length therewith and secured to the upper surface of each of the cleats and extending entirely therealong is a flat metallic plate 6, having its inner marginal portion overlying the rabbet 5. The grooves provided by the rabbets 5 and the overlying portions of the plates 6 constitute trackways for the box rack or rack section R and which box rack or rack section is of a length substantially equal to one-half the length of the floor or platform 3 although I do not wish to be understood as limiting myself to this particular proportion.

The rear portion of the floor or platform 3 is provided with the basket 7 of conventional construction except that its forward end is open. The basket 7 also extends inwardly of the floor or platform 3 at a point substantially midway thereof. The rack section R has secured to its under surface the elongated plates or metallic strips 8, each substantially co-extensive in length with the length of the rack member or section R and a marginal portion of each of said members or plates is returned to afford a flange 9 underlying said plate and which flange slidably engages within a trackway carried by the floor or platform 3.

The body B includes the longitudinally disposed and transversely spaced sills S substantially in parallelism, and rotatably supported by the rear portions of said sills S is a transversely disposed shaft 10. The portion of the shaft 10 between the sills S operates as a winding drum and has secured thereto an end portion of a flexible member 11, preferably a cable. This member or cable 11 extends forwardly and upwardly between and in contact with the longitudinally spaced guide pulleys 12 rotatably supported in desired position with respect to a slot 14 produced in the floor or platform 3. By this means, the flexible member or cable 11 is guided to overlie the upper surface of the floor or platform 3 and extends to and around the idle pulleys 15 and 15', rotatably supported at the forward end of the platform or floor 3. The member or cable 11 then extends rearwardly and is anchored to the rear portion of the rack section or rack box R. By this means, it will be readily understood that upon rotation of the shaft 10 in one direction, the rack section or rack box R will be caused to move in one direction longitudinally of the platform or floor 3 and, in the present embodiment of my invention, such movement is from the rear portion of the floor or platform 3 to the forward end portion thereof.

The shaft 10 extends outwardly beyond a sill S and fixed to said extended portion is a sprocket wheel 16 having the side marginal portions of its periphery provided with the outstanding side flanges 17 extending therearound. Disposed around the sprocket wheel 16 and between the flanges 17 is a chain 18 which extends forwardly of the body B and around an idle pulley 19 rotatably supported by a rock arm 20. The outer end portion of the arm 20 is returned as at 21, to afford an inwardly directed arm and with which arm 21 the idle pulley 19 is operatively engaged. By this means, the arm 21 coacts with the adjacent end portion of the arm 20 to hold the chain 18 against displacement from the idle pulley 19.

The inner or opposite end portion of the arm 20 is pivotally engaged, as at 22, to a plate 23, said pivotal mounting 22 being such to permit the arm 20 to have vertical swinging movement or swinging movement in a direction toward or from the adjacent rear axle 1. The plate 23 extends in a direction longitudinally of the adjacent sill S and the rear end portion of said plate 23 is pivotally engaged, as at 24, to said sill S. The opposite end portion of the plate 23 is provided with a transversely arcuate slot 24 through which extends a shank 26 carried by the sill S and engaged in said shank 26 is a clamping nut 27. By this means, the plate 23 may be adjusted with respect to the axle 1 as best complies with the requirements of practice and maintained in said desired adjustment through the instrumentality of the clamping nut 27. The inner or pivotal end portion of the arm 20 is provided with the oppositely directed arms 28 and 29 and engaged with the free end portion of the upper arm 28 is a wire 30 or other member which extends forwardly of the body B and is operatively engaged with the upstanding lever 31 whereby forward swinging movement of said lever 31 causes the arm 20 to swing downwardly to bring the lower stretch of the chain 18 in operative connection with a sprocket 32 carried by the adjacent supporting wheel 2 so that, as the vehicle or body advances, the shaft 10 will be driven from the wheel 2 to cause the rack section or rack box R to move forwardly.

The free end portion of the depending or lower arm 29 also has engaged therewith a forwardly directed wire 33 leading to and operatively engaged with a second lever 34 positioned at the forward portion of the body B. By swinging the lever 34 forwardly, the arm 20 swings upwardly and thereby disengages the lower stretch of the chain 18 from the sprocket wheel 32. As the arm 20 swings upwardly, the lever 31 swings backwardly or rearwardly and when the lever 31 is manually pushed forwardly, the lever 34 is thrown rearwardly or backwardly.

The front or forward end portion of the rack section or rack box R has adjustably engaged therewith the forwardly extending plate 35 which engages the lever 34 just before the rack section or rack box R reaches the limit of its forward movement and whereby the continued movement of said rack section or rack box R through the instrumentality of the plate 35, swings or throws the lever 34 forwardly to disengage the lower stretch of the chain 18 from the sprocket wheel 32 so that said forward movement of the rack section or rack box R will be stopped automatically.

The plate 35, as herein disclosed, is provided at its rear end portion with a longitudinally disposed slot 36 through which is disposed the clamping means 37 engaged with the adjacent portion of the rack section of box R and whereby the plate 35 may be extended forwardly of the rack section or rack box R as best meets the requirements of practice.

Pivotally engaged, as at 38, substantially midway thereof with the sill S is a vertically disposed rock arm 39, said arm being positioned in advance of but in close proximity to the shaft 10. The central portion of the arm 39 is provided with a forwardly directed arm or wing 40 with which is pivotally engaged an idle pulley 41 underlying the lower stretch of the chain 18. The outer or free end portions of the arms 28 and 29 and the corresponding end portions of the arm 39 are connected by the wire 42, or the like. By this means, as the arm 20 swings downwardly, the wing or arm 40 is also swung downwardly and a distance sufficient to free the pulley 41 from the lower stretch of the chain 18 so that said stretch is permitted to have requisite engagement with the sprocket wheel 32. As the arm 20 swings upwardly, the arm 39 is swung in a direction to move the wing or arm 40 upwardly so that the pulley 41 will engage the lower stretch of the chain 18 and thereby provide positive means for maintaining said lower stretch of the chain 18 free of the sprocket wheel 32.

Rotatably supported by the forward portions of the sills S is a transversely disposed shaft 43 provided at one end portion with a crank 44, or other means, whereby said shaft 43 may be manually rotated. The portion of the shaft 43 between the sills S also serves as a winding drum and has suitably engaged therewith an end portion of a flexible member 45. The member 45 extends rearwardly of the body B and upwardly over a pulley 46 rotatably supported by the body B and extending within a slot 47 suitably positioned in the floor or platform 3. The flexible member 45, preferably a cable, then extends forwardly and around a pulley 48 rotatably supported by the forward end portion of the rack section or box R. From this point, the flexible member or cable 45 extends rearwardly and is secured to the upper surface of the platform or floor 3 at a point substantially in transverse alinement with the pulley 46. By this means, it will be readily understood that upon rotation of the shaft 43, the rack section or rack box R may be moved to the rear portion of the floor or platform 3.

My improved wagon rack is especially adapted for use in connection with a hay loader, or kindred machine, and trails said machine in a position whereby the loader at all times discharges within the rear portion of the rack. Initially, the rack section or rack box R is moved to a position at the rear of the floor or platform 3 and when said rack section or box R has been properly filled, the driver or other operator manipulates the lever 31 to cause the chain 18 to operatively engage the sprocket wheel 32 whereupon the rack section or box R moves forwardly, as has hereinbefore been described. The rear portion of the rack is then properly filled by the loader.

I find it of advantage to provide the rear longitudinal marginal portions of the floor or platform 3 and the longitudinal marginal portions of the rack or box R with the longitudinally spaced series of spring clips 49. Each series of clips 49 are preferably two in number and in transverse alinement and are adapted to hold in applied position before a loading operation a sling, cable, or the like, so that when the rack has been filled, the load may be readily and conveniently removed.

I also find it of advantage to provide the side marginal portions of the sprocket 32 with the circumferentially extending flanges 50 which operate to hold the lower stretch of the chain 18 against displacement when in operative engagement with the sprocket wheel 32.

I also find it of advantage to interpose between the arm 29 and the adjacent sill S, at a point in advance of the plate 23, a retractile member or coil spring 51 of a sufficient tension to hold the arm 20 against accidental swinging movement.

When my improved rack is employed in connection with the collection, by hand, of bundles of grain, such as wheat, oats, barley, or the like, the section or box R is moved into its forward position and the rear transverse member 52 is removed so that the rear portion of said section or rack will be opened and the adjacent ends of the longitudinal members 53 of the rack or section R and of the basket 7 are connected and preferably through the instrumentality of the screws 54 which also are employed to hold the member 52 in applied position at the rear of the section or box R.

From the foregoing description, it is thought to be obvious that a wagon rack constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

1. A rack of the class described comprising two relatively movable sections, a shaft operatively connected with one of the sections whereby rotation of the shaft in one direction imparts movement to said section in one direction, a rotatable drive member, a swinging arm supported in proximity to the drive member, a pulley carried by the arm, an endless chain operatively engaged with the shaft and with the pulley, means for swinging the arm toward the drive member, said arm when moved toward the drive member causing a stretch of the chain to engage the drive member, automatically operated means for moving the arm away from the drive member, a second arm supported for swinging movement, means connecting the first named arm and the second named arm whereby the same have unitary movement in the same direction, and means carried by the second named arm for contact with the stretch of the chain engaging the drive member when the first named arm is moved in a direction away from the drive member.

2. A rack of the character described comprising a body, rack sections carried thereby, one of said sections being movable with respect to the other, a drive member supported by the body, a rotatable element supported by the body and operatively engaged with the movable section to impart movement to said section in one direction upon rotation of said element, a swinging plate carried by the body, means for holding the same against movement, a rock arm carried by said plate, a rotatable member carried by said arm, an endless member operatively engaged with the shaft and passing around the rotatable member carried by the arm, and means for swinging the rock arm in opposite directions, the movement of the rock arm in one direction causing a stretch of the endless member to have driven connection with the drive member.

3. A rack of the character described comprising a body, rack sections carried thereby, one of said sections being movable with respect to the other, a drive member supported by the body, a rotatable element supported by the body and operatively engaged with the movable section to impart movement to said section in one direction upon rotation of said element, a swinging plate carried by the body, means for holding the same against movement, a rock arm carried by said plate, a rotatable member carried by said arm, an endless member operatively engaged with the shaft and passing around the rotatable member carried by the arm, means for swinging the rock arm in opposite directions, the movement of the rock arm in one direction causing a stretch of the endless member to have driven connection with the drive member, and means for constantly urging the rock arm in one direction.

4. A rack of the character described comprising a body, rack sections carried thereby, one of said sections being movable with respect to the other, a drive member supported by the body, a rotatable element supported by the body and operatively engaged with the movable section to impart movement to said section in one direction upon rotation of said element, a swinging plate carried by the body, means for holding the same against movement, a rock arm carried by said plate, a rotatable member carried by said arm, an endless member operatively engaged with the shaft and passing around the rotatable member carried by the arm, means for swinging the rock arm in opposite directions, the movement of the rock arm in one direction causing a stretch of the endless member to have driven connection with the drive member, and a coil spring connecting said arm and body, said spring urging the arm in one direction.

In testimony whereof I hereunto affix my signature.

LEWIS H. HALVERSON.